Dec. 10, 1963        R. F. GROSSMAN        3,113,934
VULCANIZABLE COMPOSITION COMPRISING POLYETHYLENE, BUTYL
RUBBER, ORGANIC PEROXIDE, AND A DIMALEIMIDE
Filed Sept. 9, 1960
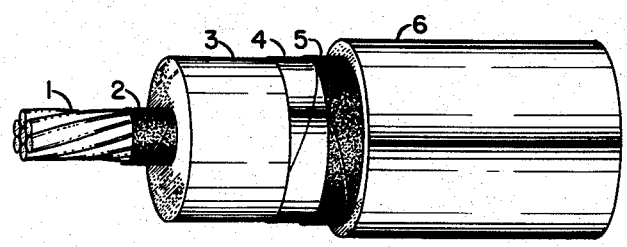
INVENTOR.
RICHARD F. GROSSMAN
BY    Victor F. Volk
HIS AGENT

United States Patent Office 3,113,934
Patented Dec. 10, 1963

3,113,934
VULCANIZABLE COMPOSITION COMPRISING POLYETHYLENE, BUTYL RUBBER, ORGANIC PEROXIDE, AND A DIMALEIMIDE
Richard Frank Grossman, Marion, Ind., assignor to Anaconda Wire and Cable Company
Filed Sept. 9, 1960, Ser. No. 54,930
8 Claims. (Cl. 260—45.5)

My invention relates to a plasticized cross linked polyethylene composition and to electric cable insulated therewith. More particularly, my invention relates to a composition of polyethylene plasticized with butyl rubber wherein the vulcanizing agent for the butyl rubber serves also as a cross linking agent for the polyethylene, and to cable insulated with such composition.

In the manufacture of electric cables it has been known that polyethylene affords particular advantages as an insulation for the metallic conductor. These advantages accrue from the fact that polyethylene has a very high insulation resistance, a very low power factor, and a low SIC. They also accrue from the fact that polyethylene is very highly impermeable to moisture and is impervious to chemical attack by a long list of corrosive agents which are known to attack other insulating materials.

The desirable properties of polyethylene make it particularly attractive for the insulation of high-voltage cables. Polyethylene is, however, partitlly handicapped for this use by its low melting point, about 105–110° C., and its rigidity in thick sections. It has been known that various rubber stocks such as butyl rubber will blend with polyethylene and serve to plasticize it, thus reducing its rigidity. Butyl rubber as used in this application refers to the synthetic rubber, also called GR-I and defined in The Condensed Chemical Dictionary, Fifth Edition, published by Reinhold Publishing Co., New York, as the product of copolymerization of approximately 98% of isobutene with 2% isoprene or butadiene.

More recently, it has been known that the softening point of polyethylene can be raised by cross-linking the long-chain molecules of the polymer. By analogy to rubber, the terms "vulcanization" and "curing" have been applied to the cross-linking process. Cross-linked polyethylene, because of its higher softening point, is particularly useful for the insulation of high-voltage cables inasmuch as such cables, for economic reasons, are operated at high conductor temperatures. Unfortunately, however, in addition to raising the softening point, vulcanization of polyethylene further increases its rigidity. This may be a serious defect for high-voltage cables which customarily have relatively thick insulation walls. It follows that any additive capable of plasticizing vulcanized polyethylene without seriously affecting its electrical properties will be a contribution to the art. Butyl rubber could be such an additive, but the known peroxide and related agents for vulcanizing polyethylene completely revert butyl rubber. On the other hand, agents known to vulcanize butyl rubber are ineffectual for cross-linking polyethylene.

The present invention achieves a vulcanized blend of polyethylene and butyl rubber by using as the curing agent a system comprising an organic peroxide and a dimaleimide having the structure:

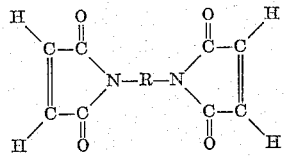

where R is a hydrocarbon moiety selected from the group consisting of phenylene, naphthylene, ethylene, hexamethylene, decamethylene and cyclohexylene moieties.

Preferably the blend of polyethylene and butyl rubber is cured by adding to it small quantities of m-phenylene dimaleimide (herinafter referred to as MPD) and dicumyl peroxide, and heating at 250–400° F. The uncured blend of the above ingredients can be extruded over an electrical conductor and vulcanized in situ by passing the cable through a chamber heated to the desired temperature. The insulation on such a cable possesses the electrical properties associated with cross-linked polyethylene but it has significantly greater flexibility than conventional cross-linked polyethylene.

The single FIGURE of the accompanying drawing is a longitudinal view, partially in section, of a cable insulated in accordance with this invention.

In the drawing, a conductor 1 is wrapped with semiconducting strand-shielding tape 2 over which an insulating wall 3 of polyethylene plasticized with butyl rubber is extruded or otherwise applied. The insulation 3 has been vulcanized in accordance with the invention, with a resulting increase in its softening temperature. The insulation 3 is wrapped with a shielding tape 4 over which is applied a cable tape 5. A jacket 6 which may be an extruded vulcanized blend of polyethylene and butyl rubber or may be theremoplastic polyethylene, PVC or other suitable jacketing is applied overall. Cable insulation compounded and cured in accordance with this invention is not, however, limited in its utility to shielded cables of the type shown in the drawing. It may be used on all types of insulated cables, including, without limitation all sorts of communication cables shielded or unshielded power cables.

There is no lower limit on the percentage of butyl rubber added to the polyethylene in accordance with the invention. In any amount it will serve to some extent as a plasticizer, but the presence of butyl rubber in an amount less than 5% will not normally have a plasticizing effect great enough economically to justify the use of a special cure system for the polyethylene. Compounds having a butyl rubber content in excess of 50% will not exhibit tensile strengths noticeable superior to butyl rubber alone. A range of butyl rubber content between 5 and 50% is therefore preferred, but useful compounds may be obtained by vulcanizing blends of polyethylene and butyl rubber which are outside this composition range.

I have found that the addition of dimaleimide in the amount of about 5% of the weight of the combined polyethylene and butyl rubber will effect thorough co-vulcanization of the blended mixture. Less than 1% of dimaleimide on the weight of the polyethylene-butyl rubber blend geenrally is ineffective for thorough vulcanization, and the addition of more than 10% will not increase the effectiveness of the cure. I prefer therefore to add 1 to 10% of dimaleimide based on the weight of vulcanizable polymer in the mixture.

Organic peroxides, and particularly dicumyl peroxide, have been known as cross-linking agents for polyethylene. For this purpose they are normally used in concentrations from 2 to 5% by weight of the polyethylene. As used in the composition of my invention, however, the organic peroxide evidently functions as a catalyst or activator for the dimaleimide, and is present in smaller proportions. I prefer to use approximately 0.3% dicumyl or other organic peroxide. A peroxide content in excess of 2% may severely revert the butyl rubber, and in general I prefer to use no more than 1%, or at the most 1.5%, of peroxide based on the weight of the polyethylene-butyl rubber blend. A peroxide content lower than 0.01% is substantially ineffective as an activator for the maleimide vulcanizing agent. Hence the amount of peroxide employed for vulcanizing the composition is in the range from 0.01–1%, or at the most 0.01–1.5%, by weight of the vulcanizable polymer.

While it is in general preferred to employ one of the peroxides that have been found successful for promoting the cross-linking of polyethylene, any organic peroxide may be used with some measure of success in combination with a dimaleimide for producing the vulcanized polyethylene-butyl rubber composition of the invention.

Curing time is not particularly critical, but is somewhat dependent on temperature. Generally the composition is cured for times and at temperatures characteristic of rubber vulcanization. Typically, the curing time is from five minutes to an hour (preferably 15 to 30 minutes) at a temperature which may range from 200 to 500° F. but which preferably is from 250 to 400° F.

It is a feature of my invention that blends of polyethylene and butyl rubber can be co-vulcanized without the addition of carbon black or other fillers or pigments. Pigments or fillers or both can be mixed into the composition, however, including silica, lithopone, carbon black, whiting and clay. When pigments or fillers are used, their effects in general are those that would be expected by persons skilled in the art of compounding rubber and plastics. Large surfaced reinforcing pigments have a toughening and strengthening effect, inert pigments will lower combustibility and cost, and selected pigments may increase opacity and/or add color.

The following examples are illustrations of compositions prepared in accordance with this invention:

|  | Parts by weight | |
|---|---|---|
|  | Example 1 | Example 2 |
| Polyethylene | 75 | 50 |
| Butyl Rubber Polymer | 25 | 50 |
| Carbon black | 40 | 40 |
| MPD | 4 | 4 |
| Dicumyl Peroxide | 0.3 | 0.3 |
| Cure temperature, F | 350 | 350 |
| Cure time, minutes | 20 | 20 |

The products obtained by vulcanizing the compositions of Examples 1 and 2 possessed high melting or softening temperatures and high tensile strengths typical of cross-linked polyethylene, but were much softer and more flexible.

I claim:

1. A vulcanizable composition of matter comprising a blend of polyethylene and butyl rubber, the copolymer of approximately 98% of isobutene and 2% of a butadiene, containing from 0.01–1.5% by weight of an organic peroxide and from 1–10% by weight of a dimaleimide having the structure

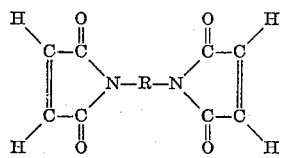

where R is a hydrocarbon moiety selected from this group consisting of phenylene, naphthylene, ethylene, hexamethylene, decamethylene, and cyclohexylene moieties.

2. A vulcanizable composition of matter comprising 50–93.99% by weight of polyethylene, 5–50% by weight of butyl rubber, the copolymer of approximately 98% of isobutene and 2% of a butadiene, 0.01–1% by weight of an organic peroxide, and from 1–10% by weight of dimaleimide having the structure

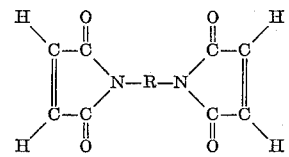

where R is a hydrocarbon moiety selected from the group consisting of phenylene, naphthylene, ethylene, hexamethylene, decamethylene, and cyclohexylene moieties.

3. A vulcanizable composition of matter comprising by weight 50–93.99% polyethylene, 5–50% butyl rubber, the copolymer of approximately 98% of isobutene and 2% of a butadiene, 1–10% m-phenylene dimaleimide, and 0.01–1.5% dicumyl peroxide.

4. The method of making a compound of polyethylene and butyl rubber, the copolymer of approximately 98% of isobutene and 2% of a butadiene, which comprises blending together and then heating to a temperature between 200 and 500° F. a mixture comprising polyethylene, butyl rubber, from 0.01–1.5% by weight of an organic peroxide, and from 1–10% by weight of a dimaleimide having the structure

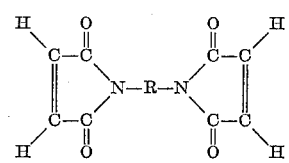

where R is a hydrocarbon moiety selected from the group consisting of phenylene, naphthylene, ethylene, hexamethylene, decamethylene, and cyclohexylene moieties and curing said mixture.

5. The method of making a vulcanized compound of polyethylene plasticized by vulcanized butyl rubber, the copolymer of approximately 98% of isobutene and 2% of a butadiene, which comprises forming an intimate blend comprising by weight 50–88.99% polyethylene, 10–50% butyl rubber, 0.01–1% organic peroxide and 1–10% dimaleimide having the structure

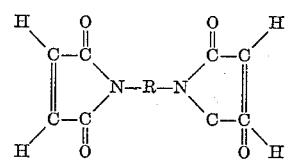

where R is a hydrocarbon moiety selected from the group consisting of phenylene, naphthylene, ethylene, hexamethylene, decamethylene, and cyclohexylene moieties and heating said blend to a temperature from 250–400° F.

6. The method of making a vulcanized compound of polyethylene plasticized by vulcanized butyl rubber, the copolymer of approximately 98% of isobutene and 2% of a butadiene, which comprises forming an intimate blend comprising by weight 50–93.99% polyethylene, 5–50% butyl rubber, 1–10% m-phenylene dimaleimide and 0.01–1.5% dicumyl peroxide, and heating said blend to a temperature from 250–400° F.

7. The method of making an insulated electric cable which comprises applying about a conductor, a blend of polyethylene and butyl rubber, the copolymer of approximately 98% of isobutene and 2% of a butadiene, with from 0.01–1.5% by weight of an organic peroxide and 1–10% by weight of dimaleimide having the structure

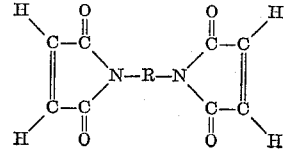

where R is a hydrocarbon moiety selected from the group consisting of phenylene, naphthylene, ethylene, hexamethylene, decamethylene, and cyclohexylene moieties, and heating said blend on the conductor to a temperature in the range from 200–500° F.

8. The method of making an insulated electric cable which comprises extruding about a conductor a blend comprising by weight 50–93.99% polyethylene, 5–50% butyl rubber, the copolymer of approximately 98% of isobutene and 2% of a butadiene, 1–10% m-phenylene dimaleimide and 0.01–1.5% dicumyl peroxide, and heating said blend on the conductor to a temperature from 250–400° F.

References Cited in the file of this patent

UNITED STATES PATENTS

| | | |
|---|---|---|
| 2,383,839 | Beekley | Aug. 28, 1945 |
| 2,569,541 | Selby | Oct. 2, 1951 |
| 2,958,672 | Goldberg | Nov. 1, 1960 |
| 3,037,954 | Gessler et al. | June 5, 1962 |

FOREIGN PATENTS

| | | |
|---|---|---|
| 1,079,146 | Germany | Apr. 7, 1960 |